United States Patent [19]
DeLange

[11] Patent Number: 5,247,964
[45] Date of Patent: Sep. 28, 1993

[54] VALVE WITH REDUNDANCY ON CLOSING

[75] Inventor: Laurent DeLange, Gasny, France

[73] Assignee: Societe Europeenne de Propulsion, Suresnes, France

[21] Appl. No.: 851,000

[22] Filed: Mar. 12, 1992

[30] Foreign Application Priority Data

Mar. 15, 1991 [FR] France ................... 91 03221

[51] Int. Cl.⁵ .................... F16K 3/314; F16K 3/22
[52] U.S. Cl. .................... 137/599; 137/613; 137/614.21; 137/637.3; 251/159
[58] Field of Search .......... 137/599, 613, 614.21, 137/637.3; 251/159

[56] References Cited
U.S. PATENT DOCUMENTS 4,568,061  2/1986  Rabe ................... 251/315

FOREIGN PATENT DOCUMENTS 2441775  6/1980  France .

Primary Examiner—Gerald A. Michalsky
Attorney, Agent, or Firm—Weingarten, Schurgin, Gagnebin & Hayes

[57] ABSTRACT

A valve with redundancy on closing comprises a single valve body, first and second substantially hemispherical hollow valve members disposed inside said valve body, each including an orifice allowing fluid to pass therethrough, independent first and second rotary drive means for the first and second hemispherical valve members, and first and second sealing devices each comprising at least one annular gasket and each associated with a respective one of the first and second valve members, the first and second valve members being of different diameters and one being nestable inside the other. It is preferable for at least one of the sealing devices to be retractable so as to avoid confining fluid inside the valve.

26 Claims, 10 Drawing Sheets

VALVE WITH REDUNDANCY ON CLOSING

FIELD OF THE INVENTION

The present invention relates to a valve with redundancy on closing, i.e. a valve in which the probabilities of the valve accidentally opening or failing to close are substantially smaller than the probability of the valve failing to respond to an open command, which probability must itself be very low. Such a valve may be used in various different fields, in particular in the nuclear industry, in the chemical industry with toxic or corrosive substances, and in space or aviation applications. If the case of feeding an installation with a dangerous fluid is taken by way of example, then the risks associated with the valve not closing and fluid leaking into the installation are substantially greater than the risks associated with the same valve failing to respond to an open command, which merely gives rise to a delay in starting.

PRIOR ART

In certain hydraulic applications requiring high safety levels, it is common to provide dispositions preventing nonauthorized or accidental initiation of fluid flow in a duct by connecting two valves in series on the duct so as to provide redundancy on closing in the event of a fault in the process of closing one of the valves. French patent application number 2 441 775 describes a set of two valves connected in series on the forced duct upstream from a hydraulic machine, and constitutes one example of the prior art.

Such a connection of two valves in series is used in space applications on certain launchers, and also in nuclear power stations.

The large bulk constituted by such an assembly of two valves is a first drawback that is associated with the drawback of twice the mass of a single valve. In addition, the presence of two valves requires assembly that is more complex than when only one valve is required, thereby increasing the cost of the installation.

Proposals have also been made to use a single valve having a single valve member, in association with redundant control means. Main valves on the space shuttle thus use redundant hydraulic control acting on a single actuator.

However, valves of that type cannot prevent failure to close in the event of the single actuator itself failing.

Full redundancy has also been proposed, for example in the Apollo lunar module, using a system comprising a group of four valves organized as two parallel circuits, each including two valves in series.

Under such circumstances, the overall system includes four valve bodies, thereby giving rise to excessive bulk and complexity.

OBJECT AND BRIEF SUMMARY OF THE INVENTION

An essential object of the invention is therefore to remedy the above-mentioned drawbacks and to make it possible to satisfy safety requirements while reducing bulk, mass, and assembly costs.

Another object of the invention is to provide a single valve that is simple to use.

Another object of the present invention is to provide a valve whose sealing system is organized in such a manner that it does not allow certain volumes of liquid conveyed through the valve body to become confined therein, and in addition limits friction, thereby reducing wear of the sealing means.

These objects are achieved by a valve with redundancy on closing which comprises a single valve body, first and second substantially hemispherical hollow valve members disposed inside said valve body, each including an orifice allowing fluid to pass therethrough, independent first and second rotary drive means for the first and second hemispherical valve members, and first and second sealing devices each comprising at least one annular gasket and each associated with a respective one of the first and second valve members, the first and second valve members being of different diameters and one being nestable inside the other.

By having a single valve body containing two concentric hollow valve members that are of different sizes and nestable, and that are under the control of two independent actuators, the valve of the invention achieves redundancy on closing by implementing two independent seals, without it being necessary to couple two distinct valves in series, thereby greatly reducing the mass, the bulk, and the complexity of the assembly, with these advantages being particularly important in space and aviation applications where on-board mass and volume must be as small as possible.

When a valve is used with toxic or corrosive cryogenic fluids, it is essential that the fluid is not confined inside the valve.

Under such circumstances, it is appropriate, in particular, to avoid both valve members sealing simultaneously when closing both members of the valve, and to use at least one retractable valve member gasket.

In a first main embodiment of the invention, the first and second sealing devices are retractable and are interconnected by at least one spacer disposed inside the first and second valve members such that when one of the first and second sealing devices is open, the other sealing device is closed.

In which case, in a first variant, the means for retracting the retractable sealing device co-operating with the upstream, first valve member are controlled directly or indirectly by the position of said first valve member co-operating with said sealing device.

More particularly, the means for retracting the retractable sealing device co-operating with the first valve member may comprise a cam whose position is defined by the position of said first valve member co-operating with said sealing device, the profile of the cam being such that closing the first valve member causes said sealing device to close, while opening the first valve member causes said sealing device to open.

In a second variant, the means for retracting the retractable sealing device co-operating with the downstream, second valve member are controlled directly or indirectly by the position of said second valve member co-operating with said sealing device.

More particularly, and analogously to the first variant, the means for retracting the retractable sealing device cooperating with the second valve member may comprise a cam whose position is defined by the position of said second valve member co-operating with said sealing device, the profile of the cam being such that closing the second valve member causes said sealing device to close, while opening the second valve member causes said sealing device to open.

In a second main embodiment of the invention, one of the sealing devices is not retractable, and comprises a sealing gasket constituted by a lip gasket, while the other one of the first and second sealing devices is retractable, means being provided to retract the retractable sealing device for the purpose of preventing fluid becoming confined inside the valve.

In which case, in a first variant, the retractable sealing device is situated in the vicinity of the upstream, first valve member and is controlled as a function of the position of the downstream, second valve member such that said retractable sealing device is in its closed position when the second valve member is open, and vice versa.

More particularly, the valve may comprise a cam secured to the second valve member to control retraction of the retractable sealing device situated in the vicinity of the first valve member.

In a second variant, the retractable sealing device is situated in the vicinity of the downstream, second valve member and is controlled as a function of the position of the upstream, first valve member such that said retractable sealing device is in its closed position when the first valve member is open, and vice versa.

More particularly, and analogously to the first variant, the valve may comprise a cam secured to the first valve member to control retraction of the retractable sealing device situated in the vicinity of the second valve member.

In the variants of the first and second main embodiments, when no use is made of a cam secured to the first or second valve member for controlling retraction of a retractable sealing device, the sealing devices may be caused to retract by a command from specific actuators that do not receive energy from either of the valve members, such as mechanical, hydraulic, pneumatic, electrical, or pyrotechnic control means.

Such actuators may be included in the valve.

One or more pressure sensors may be provided in the inlet or outlet lengths of valve duct, in the proximity of the valve members for the purpose of controlling retraction of the sealing devices as a function of the sensed pressure.

It is also possible to control retraction of the sealing devices by sensors for sensing the positions of the valve members.

The sensors may be controlled by any member secured to the rotary assembly comprising the valve member, the shaft, and the rotor of a control device.

In order to limit friction between the gaskets and the valve members, it is advantageous for the sealing devices to be capable of being temporarily lifted off, at least while the valve members are rotating and regardless of whether or not they are retractable for the purpose of avoiding confinement. I.e. the sealing devices should be capable of being moved slightly so as to lose contact with the valve members with which they co-operate. The means used for lifting off the sealing devices should not be the same as the means used for controlling the greater retraction of the gaskets for the purpose of avoiding confinement.

The axes of rotation of the first and second valve members may coincide even though their rotary drive means are independent or distinct, thereby further improving reliability by having independent rotary shafts.

The first and second rotary drive means for the first and second valve members may be situated on the same side of the valve body or they may be situated on two diametrically opposite sides thereof.

The valve may include lengths of fluid inlet and outlet duct that are in alignment or else that extend in different directions.

In a particular embodiment, the valve includes a monitor device triggering closure of one of the first and second valve members with a predetermined time delay relative to the command to close the other valve member and in the event that nonclosure of said other valve member is detected at the end of said predetermined time delay.

In which case, confinement is not possible since both valve members cannot be closed simultaneously, and therefore devices for causing major retraction of the gaskets are not required. Nevertheless, as mentioned above, it is still advantageous for the gaskets to leave a small gap, i.e. for them to be liftable off while the valve members are rotating in order to avoid friction.

The mechanical strength of the valve members can be increased to enable them to operate under high pressure, either by using massive members of considerable thickness, or else by using stiffeners and more particularly a criss-cross mesh of stiffeners constituting cells.

The invention also provides an assembly that is totally redundant, both on closing and on opening, for controlling the flow of fluid along a main duct, the assembly comprising a circuit that is inserted in said main duct and that comprises two parallel branches each fitted with a valve that is redundant on closing.

BRIEF DESCRIPTION OF THE DRAWINGS

Other characteristics and advantages of the invention appear from the following description of particular embodiments given by way of non-limiting example, and described with reference to the accompanying drawings, in which.

DETAILED DESCRIPTION OF PARTICULAR EMBODIMENTS

Figure 1:
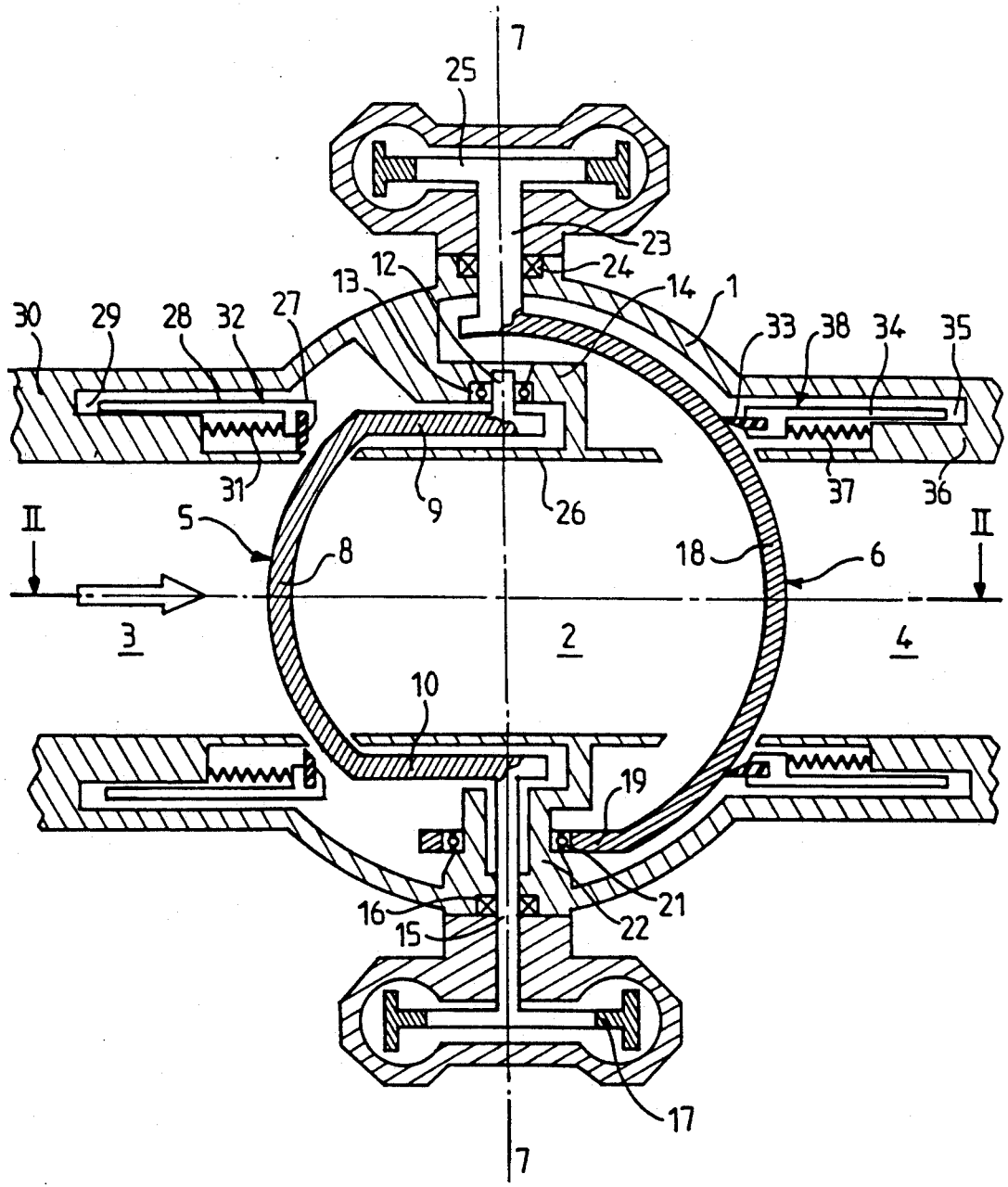
FIG. 1 is a vertical axial section through a valve of the invention on line I—I of FIG. 2, with the valve members being in the closed position.

An example of a valve of the invention shown in FIG. 1 comprises a body 1 provided with a spherical cavity 2 into which there open out both an upstream fluid inlet duct 3 and a downstream fluid outlet duct 4. In the embodiment of FIG. 1, the two ducts 3 and 4 are in alignment and their shape and dimensions are identical. Inside the cavity 2, there are two valve members 5 and 6 each capable of rotating about a common axis that is perpendicular to the axis of the ducts 3 and 4.

The valve member 5 comprises a spherical central region 8 extended by two flat regions 9 and 10 that are opposite and parallel. The spherical region 8 includes an orifice 11 (FIG. 2) having the same shape and size as the duct 3. The flat region 9 includes a stub axle 12 mounted to rotate about the axis 7 by means of a bearing 13 supported by the body 1 via a bracket 14. The flat region 10 has a shaft 15 mounted to rotate about the axis 7 by a fluid-tight bearing 16 mounted directly on the body 1. The end of the shaft 15 carries a control device 17 of appropriate shape and size. The control device 17 for the valve member 5 may be constituted by any known automatic control device that may be mechanical, hydraulic, or electrical.

The valve member 6 comprises a spherical region 18 extended by a flat region 19. The spherical region 18 is larger in diameter than the spherical region 8 of the valve member 5 so as to be capable of pivoting outside the valve member 5, which valve member 5 is thus nestable inside the valve member 6. The spherical region 18 includes an orifice 20 (FIG. 2) which is identical in shape and size to the duct 4. The flat region 19 is mounted to rotate about the axis 7 by a bearing 21 on an extension 22 of the body 1. The end of the valve member 6 which is diametrically opposite to the flat region 19 has a shaft 23 rotatably mounted about the axis 7 by means of a fluid-tight bearing 24 on the body 1. The end of the shaft 23 carries a control device 25 of suitable configuration analogous to the device 17. The control device 25 of the valve member 6 can thus likewise be constituted by any known type of automatic control device which is mechanical, hydraulic, or electrical. Inside the cavity 2, there is a length of duct 26 having the same shape and dimensions as the ducts 3 and 4. This length of duct 26 is secured to the body 1 by the bracket 14 and by the extension 22. This length of duct 26 is provided for the purpose of ensuring continuity in the fluid streamlines when the valve is open.

The valve member 5 co-operates with a sealing gasket 27 which may be a lip gasket, for example. The gasket 27 is fixed on a gasket carrier 28 in the form of a sleeve slidably mounted in a groove 29 in the wall 30 of the duct 3. A bellows 31 is fixed at one of its ends to the wall 30 and at its other end to the gasket carrier 28, thereby providing sealing. The assembly constituted by the gasket carrier 28 and the gasket 27 forms the sealing device 32 which is associated with the valve member 5.

The valve member 6 co-operates with a sealing gasket 33 which may be a lip gasket, for example. The gasket 33 is fixed on a gasket carrier 34 in the form of a sleeve slidably mounted in a groove 35 of the wall 36 of the duct 4. A bellows 37 is fixed at one of its ends to the wall 36 and at its other end to the gasket carrier 34, thereby providing sealing. The assembly constituted by the gasket carrier 34 and the gasket 33 forms the sealing device 38 associated with the valve member 6.

Figure 2:
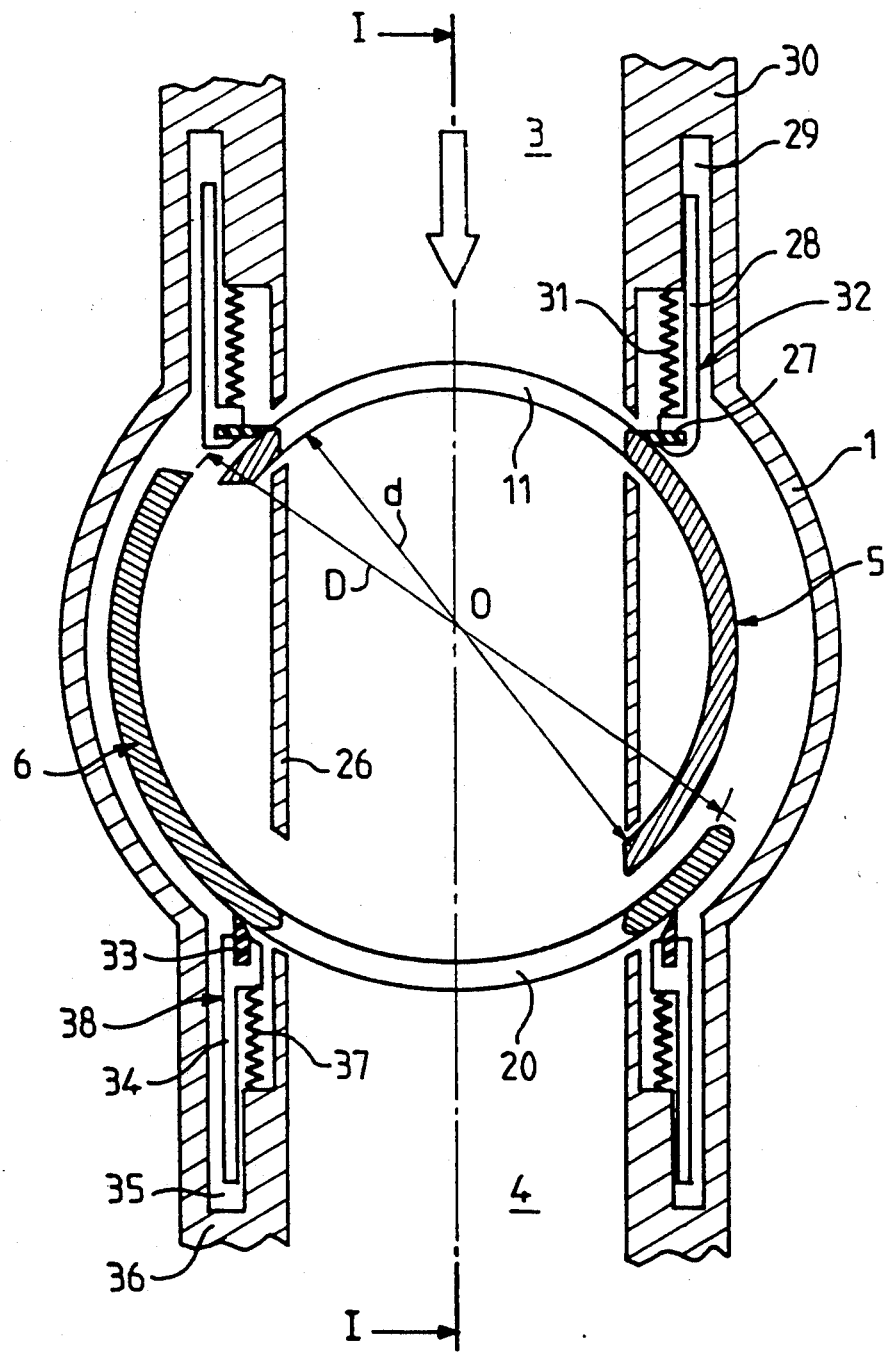
FIG. 2 is a plan view of the same valve in axial section on line II—II of FIG. 1, the valve members being in the open position.

The diameter d of the valve member 5 is less than the diameter D of the valve member 6 (FIG. 2). Thus, when relative motion occurs between the valve members about the point O, the valve member 5 is overlapped by and is nested within the valve member 6. This disposition, and the presence of two independent control devices 17 and 25 for the valve members 5 and 6 enables each of the valve members to close the valve regardless of the position of the other valve member. In addition, either valve member can rotate in either direction. Successive or simultaneous actuation of the valve members to the fluid stream closing position makes it possible to provide redundancy on closing for the valve.

The sealing devices 32 and 38 may comprise stationary rubbing gaskets. However, according to an advantageous characteristic of the present invention, each gasket 27 and 33 is capable of being lifted off, i.e. of being moved a little away from the valve member 5 or 6 with which it co-operates while said valve member is rotating. This disposition has the advantage of avoiding friction between the gasket 27 or 33 and the corresponding valve member 5 or 6 while it is moving, thereby limiting gasket wear. A cam mounted on the rotary shaft of each of the two valve members causes the corresponding sealing device 32, 38 to retract while the valve member 5 or 6 is rotating. If the gaskets 27 and 33 are constituted by stationary gaskets, they are pressed against the corresponding valve member 5 or 6 when in its closed position, and possibly also when in its open position. In contrast, if the gaskets 27 and 33 are designed so as to be retractable in order to avoid confining fluid inside the valve, then the gaskets 27 and 33 are selectively put into contact or not with the corresponding valve members, as described below.

If a valve of the invention is used in a circuit that conveys cryogenic fluids, then it must not confine said fluid within the valve. More precisely, under no circumstances must a volume of the fluid remain enclosed inside the cavity 2 between the valve members 5 and 6 when in the closed position without that volume of fluid being in communication with one or other of the ducts 3 and 4.

On analyzing the function of retracting the gaskets 27 and 33 to avoid confining liquid in the valve of the invention when in the closed position, and ignoring the highly unlikely case of neither valve member 5 and 6 closing so that non-confinement has no meaning, it can be seen that there are three possible states in which the valve may be found when it receives a close command.

In a first possible state, the upstream valve member closes while the downstream valve member does not close. Under such circumstances, the gasket for the upstream member must be closed to seal the valve, i.e. it must be released so that it presses against the upstream valve member. The gasket for the downstream member may be open or closed. There is no risk of confinement since the liquid contained inside the valve is evacuated via the outlet duct.

In a second possible state, the upstream valve member does not close, while the downstream valve member does close. Under such circumstances, the gasket for the upstream member may be open or closed. There is no risk of confinement since the liquid contained inside the valve is in continuity with the liquid contained in the inlet duct.

In contrast, the gasket for the downstream valve member must be closed to provide valve sealing.

In a third possible state, which constitutes the state that is most frequent in practice, both valve members close. Non-confinement can then be achieved in two different ways:

Firstly, the upstream member gasket may be closed to provide valve sealing while the downstream member gasket is open to ensure non-confinement by evacuation of the contents of the valve into the outlet duct.

Secondly, the upstream member gasket may be open to ensure non-confinement by continuity between the inside of the valve and the upstream duct, while the downstream member gasket is closed to ensure valve sealing.

Non-confinement can thus be achieved in this third possible state of the valve either by continuity with the upstream duct or by continuity with the downstream duct. Which of the possible variants is selected depends on the fluid being conveyed (the kind of fluid, its temperature, the pressure of a gas in the downstream duct when the valve is closed), and on the materials from which the valve is made.

Figure 6:
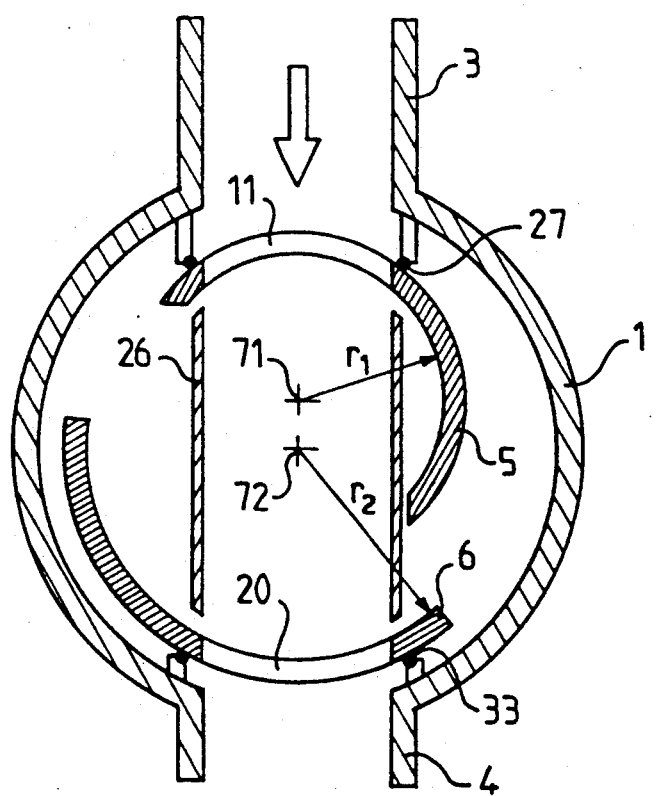
FIGS. 6 and 7 are diagrammatic plan views in axial section showing variants of the valve of the invention in the open position.
Figure 6A:
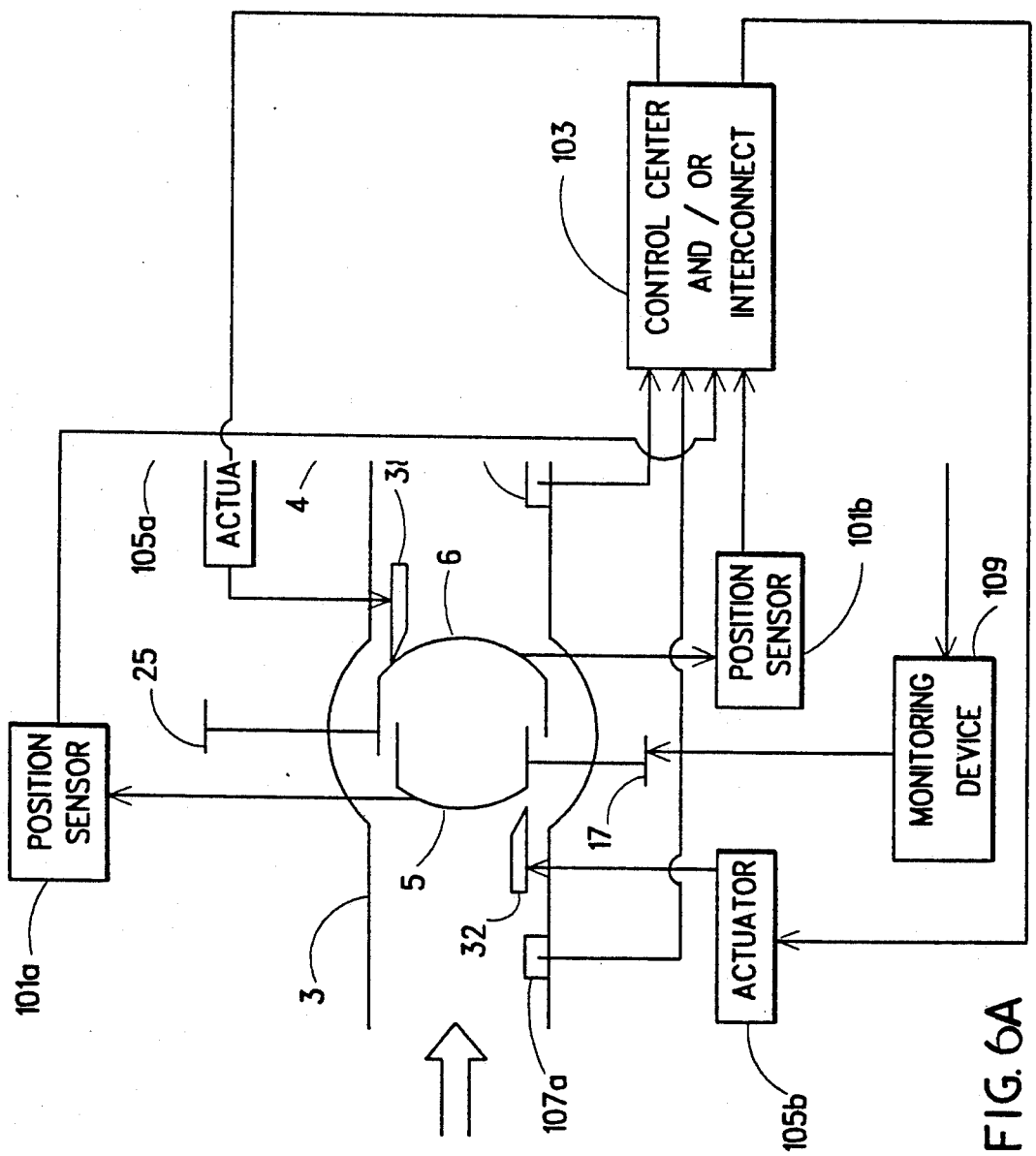
FIG. 6A is a schematic view of an implementation of the valve of the invention.

As shown in FIG. 6A, the sealing devices 32 and 38 may be controlled to retract by a command external to the valve using actuators 105a and 105b that act mechanically, hydraulically, electrically, or pyrotechnically, and which may possibly be themselves controlled by position sensors 101a and 101b for sensing the positions of the component parts of the valve, by pressure sensors 107a and 107b disposed in the fluid ducts in the vicinity of the valve members, or by a control center 103 which receives all of the available information about the state of the system.

Nevertheless, it is preferable for the system that controls retraction of the sealing devices to be constituted by mechanical control means internal to the valve. Under such circumstances, four different configurations may be envisaged.

In a first configuration as shown in FIGS. 1 and 2, one of the gaskets is retractable while the other gasket remains stationary (while possibly still being capable of being lifted off a little from the valve member during rotation thereof).

In FIGS. 1 and 2, the downstream gasket 33 is stationary and the downstream valve member 6 controls the opening and closing movements of the upstream gasket 27 (respectively retracting it and putting it into contact with the upstream valve member 5) so that the upstream gasket 27 is closed when the downstream valve member 6 is open (FIG. 2) and so that the upstream gasket 27 is open when the downstream valve member 6 is closed (FIG. 1).

If the downstream valve member 6 is the only one to close, with the upstream valve member 5 remaining open, then non-confinement is provided upstream, as it is in the configuration shown in FIG. 1 where both valve members 5 and 6 are closed. In contrast, if the upstream valve member 5 is the only one to close, with the downstream valve member 6 remaining open, then non-confinement is provided downstream.

Figure 8:
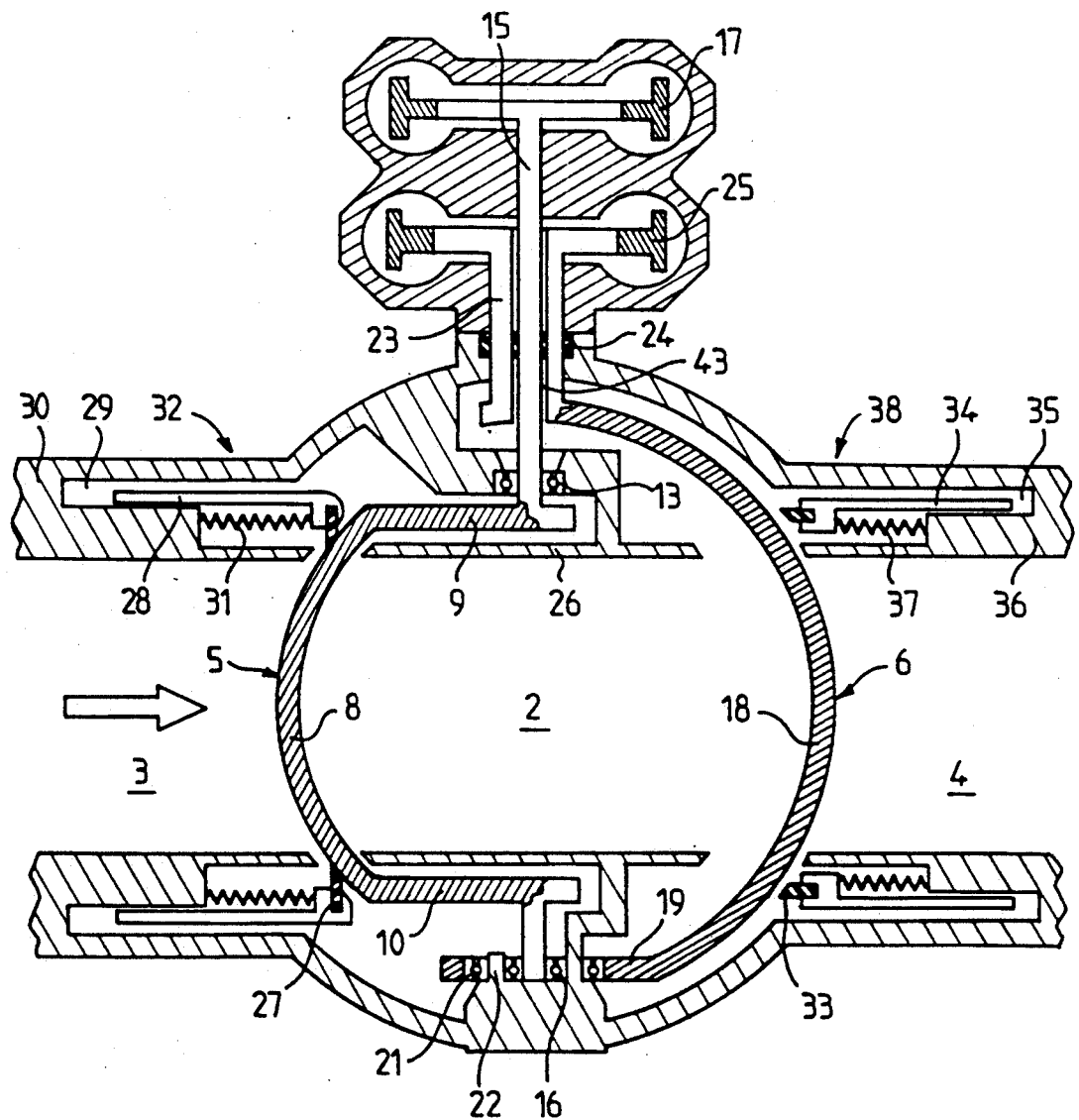
FIG. 8 is a vertical axial section view analogous to FIG. 1, but showing a different implementation of the valve member control means.
Figure 11:
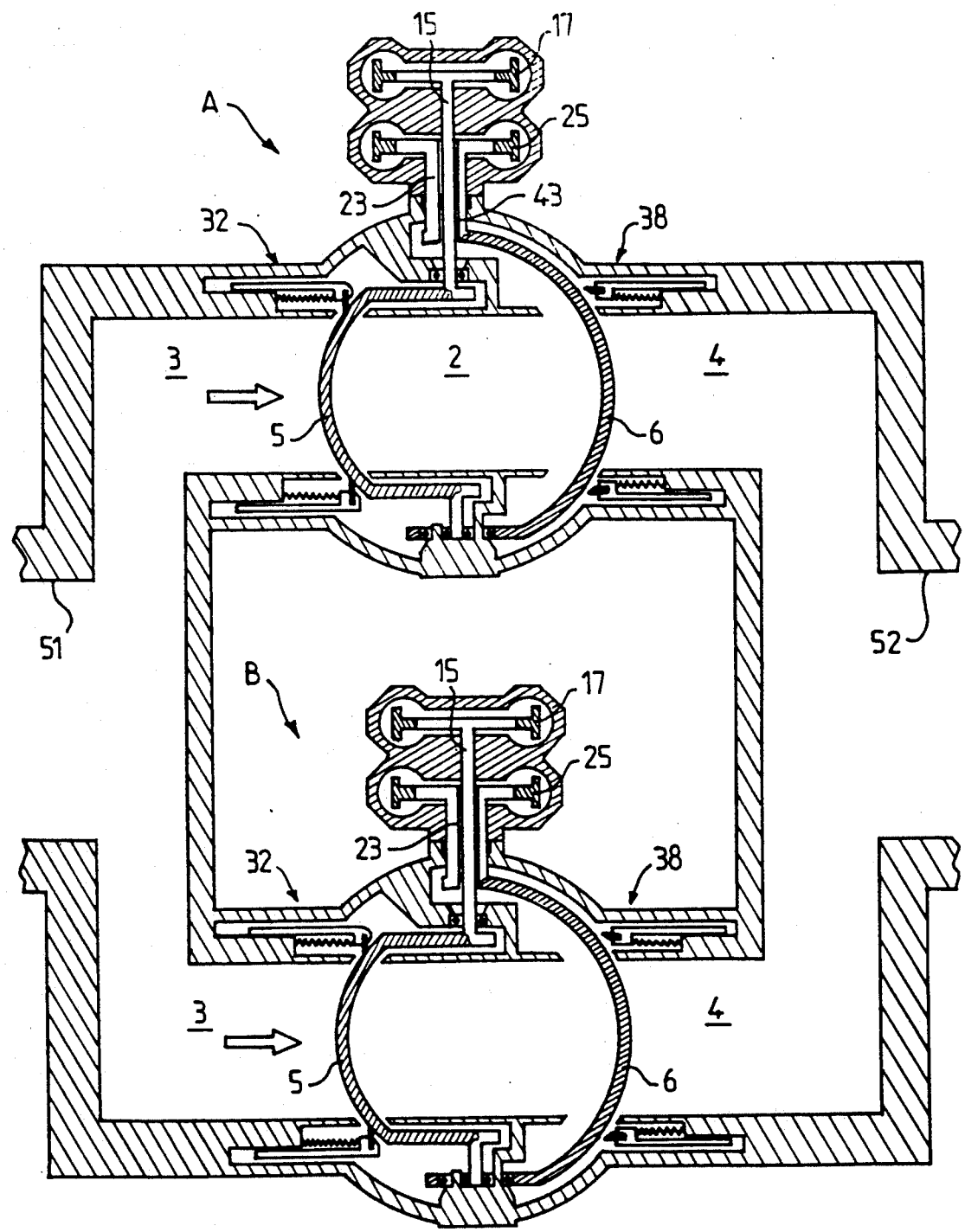
FIG. 11 is a diagrammatic vertical axial section showing two valves of the invention associated in parallel.

FIGS. 8 and 11 show a second possible configuration enabling control means internal to the valve to obtain selective retraction of one of the gaskets while the other gasket remains stationary (while possibly nevertheless being capable of being a non-friction gasket, i.e. being capable of being lifted a little off the corresponding valve member while said member is rotating). This configuration corresponds to the above-described configuration, but the roles of the gaskets for the upstream and downstream valve members are interchanged.

Under such circumstances, the upstream gasket 27 is stationary and the upstream valve member 5 controls the downstream sealing device 38 including the downstream gasket 33 so that said downstream gasket 33 is closed when the upstream valve member 5 is open and so that the downstream gasket 33 is open when the upstream valve member 5 is closed.

If the upstream valve member 5 is the only one to close, with the downstream valve member 6 remaining open, then non-confinement is provided downstream, as it is when both valve members 5 and 6 are open. In contrast, if the downstream valve member 6 is the only one to close, with the upstream valve member 5 remaining open, then non-confinement is provided upstream.

In the first configuration, a cam (not shown) may be fixed to the shaft of the downstream valve member 6 to control the sealing device 32 which includes the gasket 27 associated with the other valve member 25, the cam being set so that when the downstream valve member 6 is closed, it opens the upstream gasket 27.

In the second configuration, a cam (not shown) may be fixed to the shaft of the upstream valve member 5 to control the sealing device 38 which includes the gasket 33 associated with the other valve member 6, the cam being set so that when the upstream valve member 5 is closed, it opens the downstream gasket 33.

Figure 5:
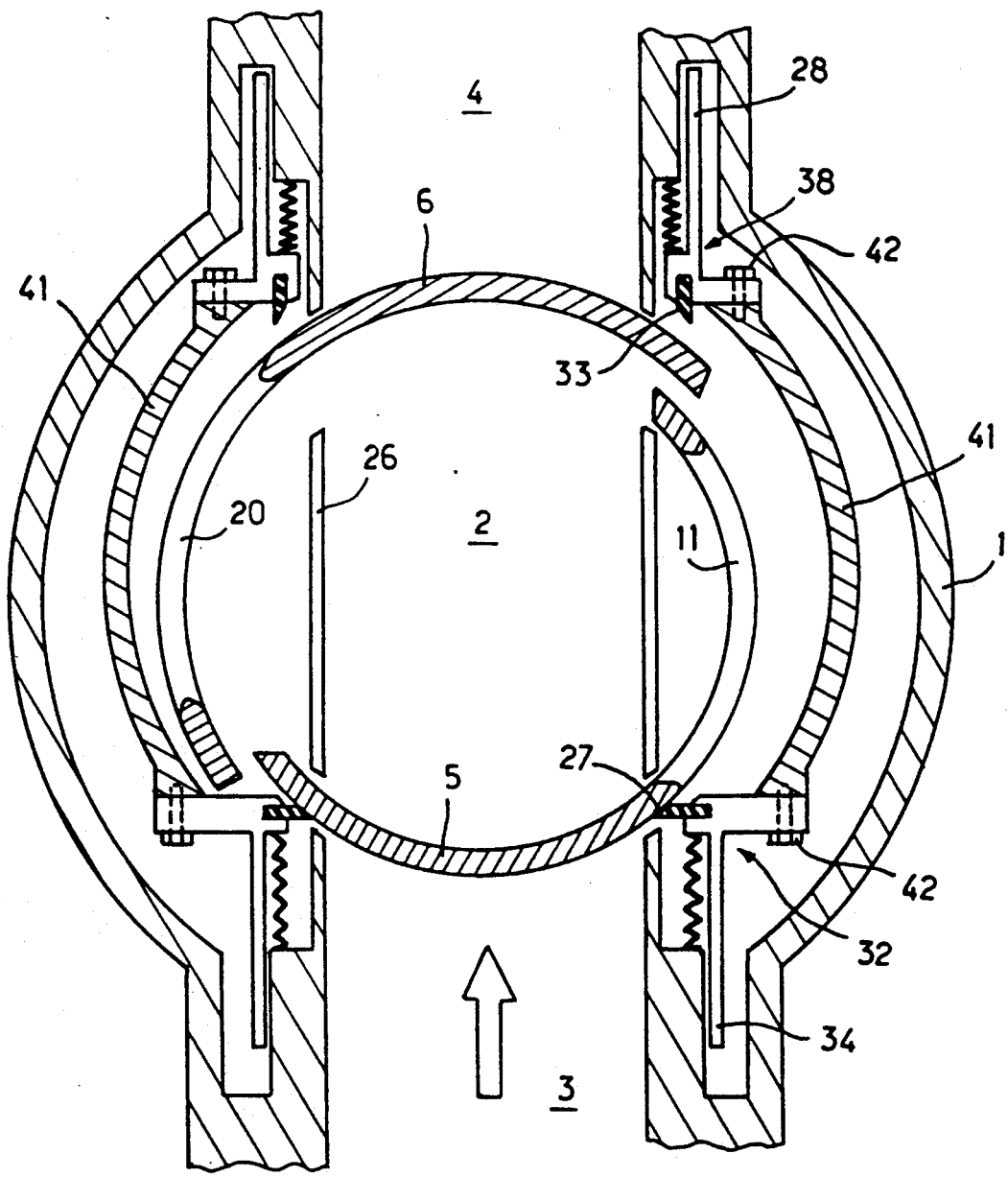
FIG. 5 is a plan view in axial section of a valve of the invention in the closed position, showing a spacer that interconnects both gaskets in certain particular embodiments.

In a third possible configuration, as shown in FIG. 5, control means internal to the valve for preventing fluid confinement makes use of two retractable gaskets.

In this case, the upstream and downstream sealing devices 32 and 38 are interconnected by a spacer 41 such that when the downstream gasket 33 is open, the upstream gasket 27 is closed, and vice versa.

The upstream valve member 5 is the only one to carry a cam 40 (FIGS. 3 and 4) which acts on a cam 39 secured to the upstream sealing device 32 to control displacements of the upstream gasket 27. The profile of the cam 40 is such that closing the upstream valve member causes the upstream gasket 27 to be closed, and vice versa.

In this third configuration, if the upstream valve member 5 is the only member to close, with the downstream valve member 6 remaining open, as when both valve members 5 and 6 are closed simultaneously, then non-confinement is provided downstream. In contrast, if the downstream valve member 6 is the only one to close while the upstream valve member 6 remains open, then non-confinement is provided upstream.

Figure 12:
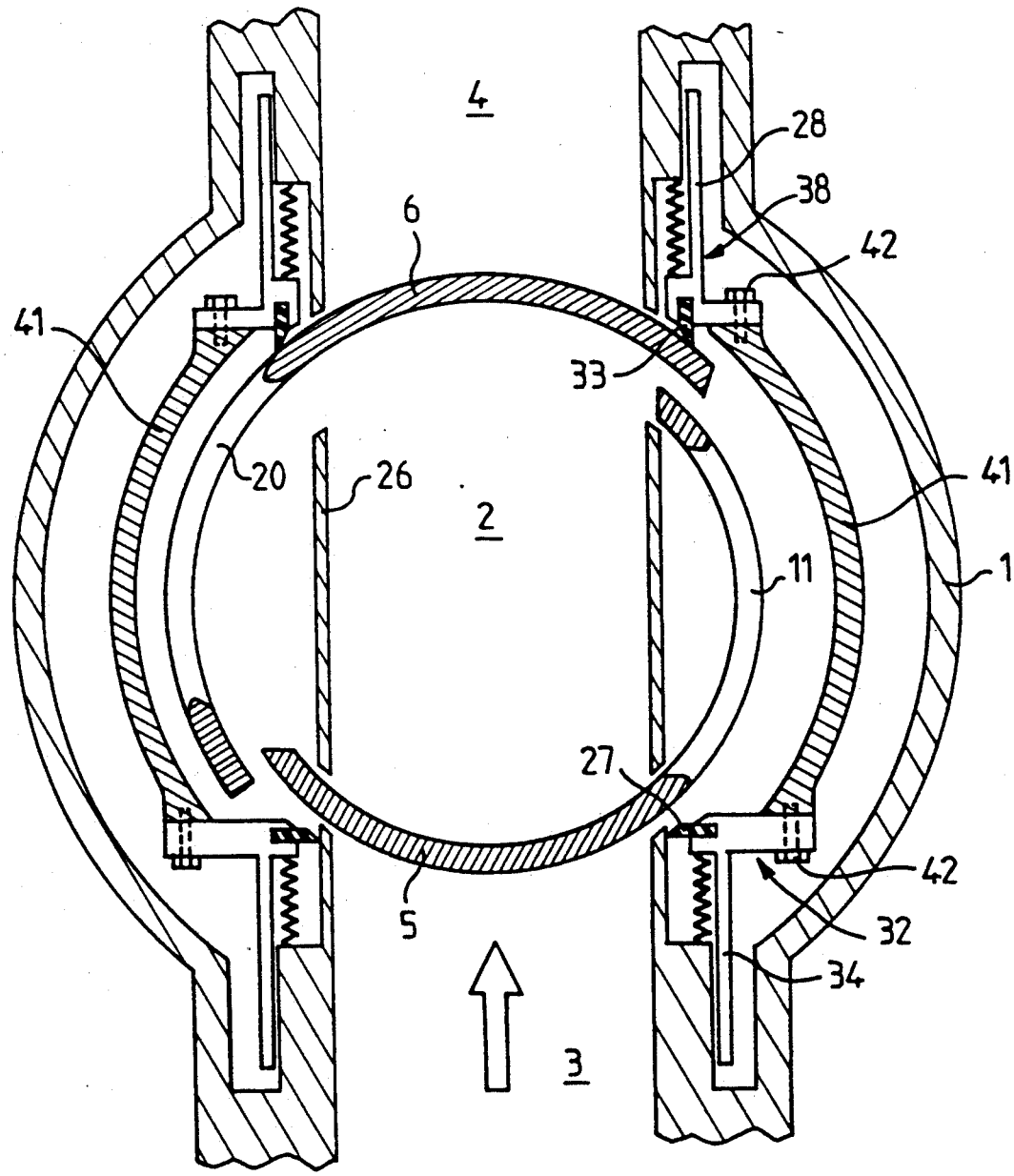
FIG. 12 is a view analogous to FIG. 5 showing a spacer interconnecting the two gaskets, but corresponding to a variant embodiment.

A fourth possible configuration, as shown in FIG. 12, is similar to the third configuration as described above, but the roles of the upstream and downstream valve members and gaskets are interchanged.

Under such circumstances, the upstream and downstream sealing devices 32 and 38 are likewise connected together by a spacer 41 such that when the downstream gasket 33 is opened the upstream gasket 27 is closed, and vice versa.

Figure 3:
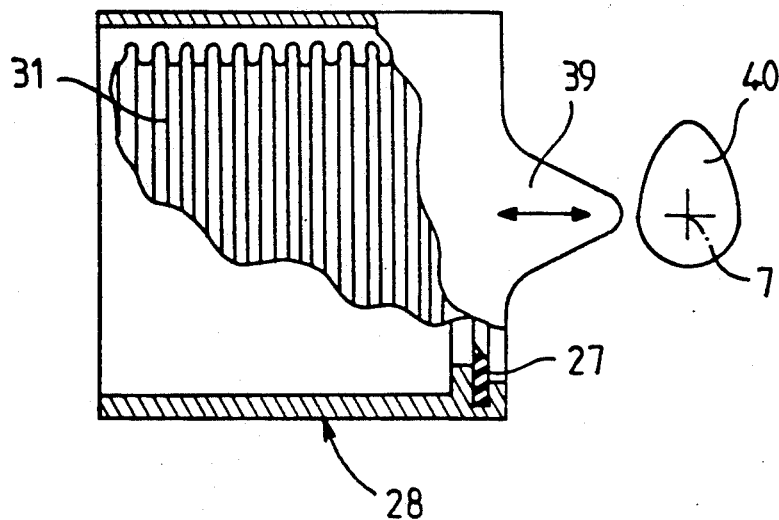
FIG. 3 is a partially cutaway plan view of one example of a gasket carrier and of an actuator cam suitable for use in a valve of the invention.
Figure 4:
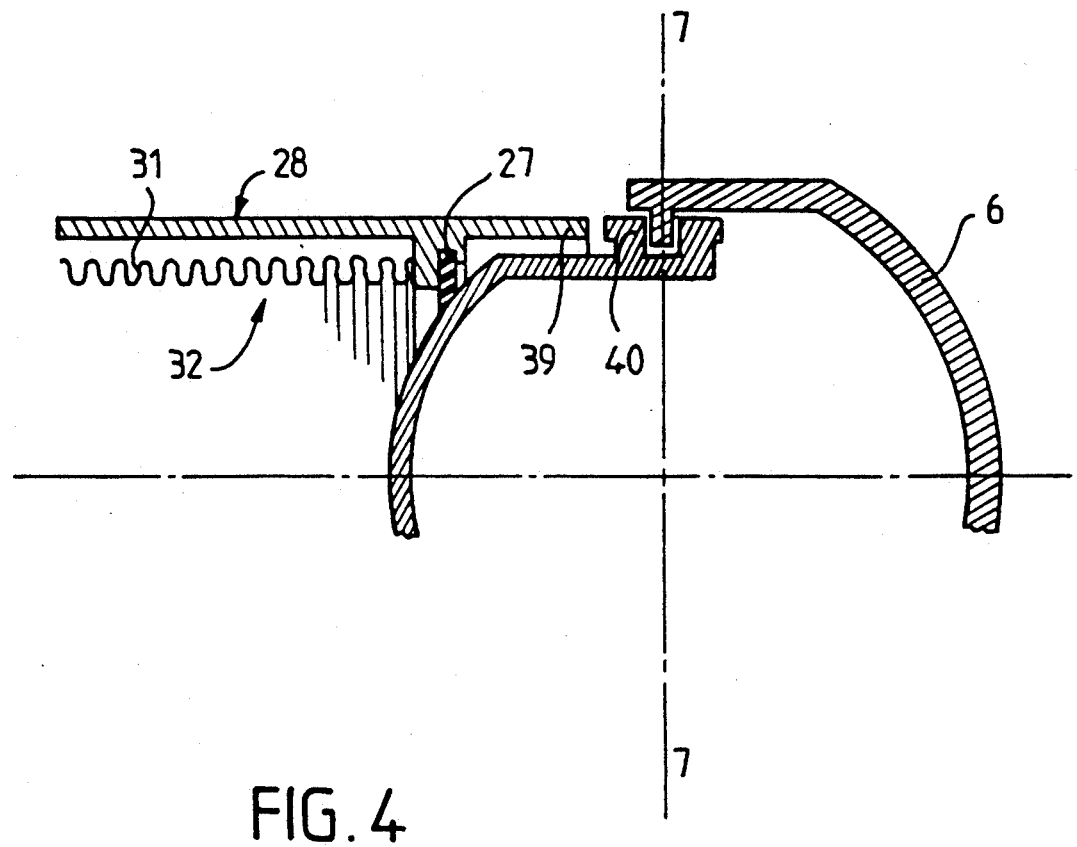
FIG. 4 is a vertical half-section showing one example of how the FIG. 3 gasket-carrier can be controlled to retract.

Only the downstream valve member 6 carries the cam, which cam is similar to the cam 40 of FIGS. 3 and 4. This cam acts on a cam similar to the cam 39 of FIGS. 3 and 4 but secured to the downstream sealing device 38 to control the displacement of the downstream gasket 33. The profile of the cam is such that closure of the downstream valve member 6 closes the downstream gasket 33, and vice versa.

In this fourth configuration, if the downstream valve member 6 is the only one to close with the upstream valve member 6 remaining open, and likewise if both valve members 5 and 6 are closed simultaneously, then non-confinement is achieved upstream. In contrast, if the upstream valve member 5 is the only one to close while the downstream valve member 6 remains open, then non-confinement is achieved downstream.

FIG. 6 is a diagram showing another embodiment of the present invention. In thsi embodiment, the axes of rotation of the two nestable valve members do not coicide. This disposition makes it possible to improve the reliability of the valve since the axes about which the valve members move are totally independent.

Figure 7:
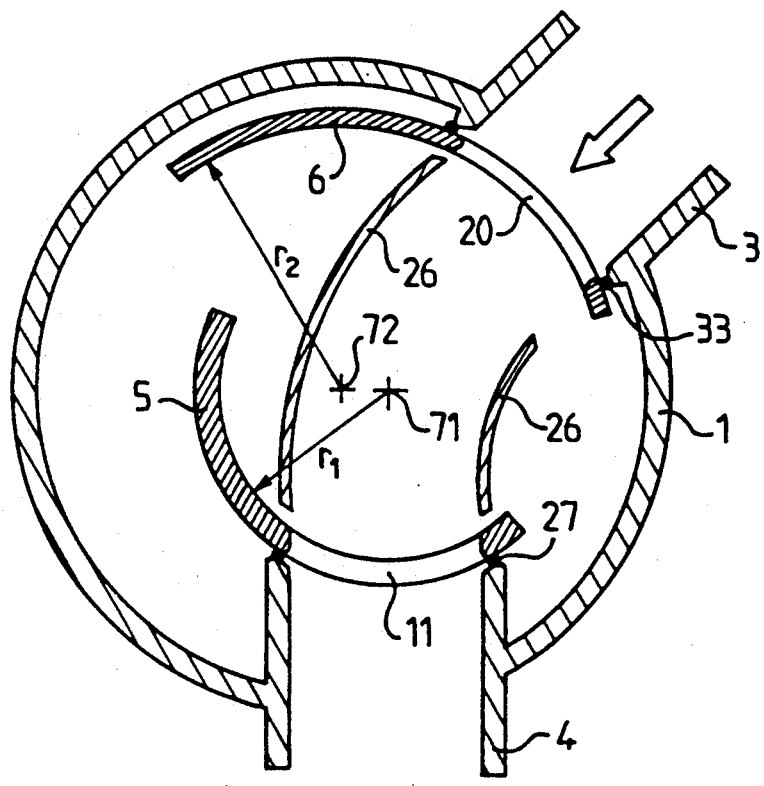

FIG. 7 is a diagram of another embodiment of the present invention. In this embodiment, the axes of rotation 71 and 72 of the two valve members 5 and 6 are likewise distinct, but this is not essential and the two axes could equally well coincide. In addition, the fluid inlet and outlet ducts 3 and 4 are not in alignment, but they extend in different directions. Under such circumstances, the length of duct 26 is appropriately shaped to ensure continuity of the fluid flow streamlines. In FIG. 1, 2, 5, and 6, and also in FIG. 8, the fluid inlet duct 3 is shown as being situated adjacent to the smaller diameter valve member 5 while the larger diameter valve member 6 is shown as being adjacent to the fluid outlet duct 4.

However, the roles of the ducts 3 and 4 could be interchanged, and in FIG. 7 a fluid inlet duct 3 is shown as being adjacent to the larger diameter valve member 6 while a fluid outlet duct 4 is shown as being adjacent to the smaller diameter valve member 5.

FIG. 8 shows a variant embodiment of the present invention in which both of the control devices 17 and 25 for rotating the valve members 5 and 6 are situated on the same side of the valve and not on diametrically opposite sides as in FIG. 1. In this case, the shaft 23 is pierced by a bore 43 for passing the shaft 15. The control devices 17 and 25 are capable of controlling the movements of the valve members 5 and 6 independently from each other.

The control devices 17 and 25 for the valve members 5 and 6 shown in FIGS. 1, 8, and 11 may be constituted by any automatic control device that is mechanical, hydraulic, pneumatic or electrical. In addition, an active monitoring device 109, as shown in FIG. 6a, may be provided which triggers a command for closing the smaller diameter valve member 5 after a certain time delay and only in the event that when said time delay has elapsed, the monitoring device detects that the larger diameter nominal valve member 6 has not closed.

The first and second valve members 5 and 6 may be controlled to rotate in the same direction or to contrarotate, i.e. to rotate in opposite directions. Regardless of whether the valve members 5 and 6 are controlled synchronously or after a time lapse, it is nevertheless important for the control means 17 and 25 to be independent so that it is always possible to ensure that the valve is closed with one or other of the valve members regardless of the position of the other.

Figure 9:
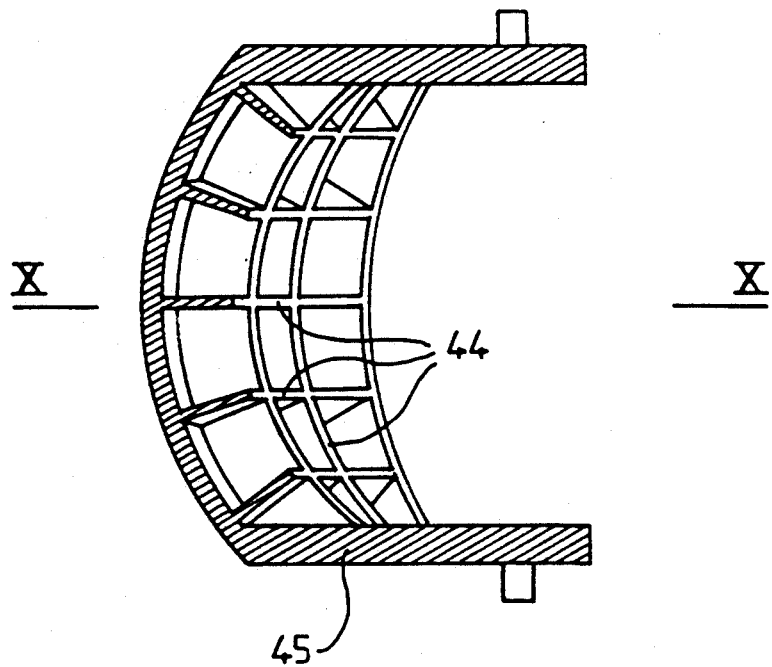
FIG. 9 is a vertical section of line IX—IX of FIG. 10 through a valve member suitable for a valve of the present invention.
Figure 10:
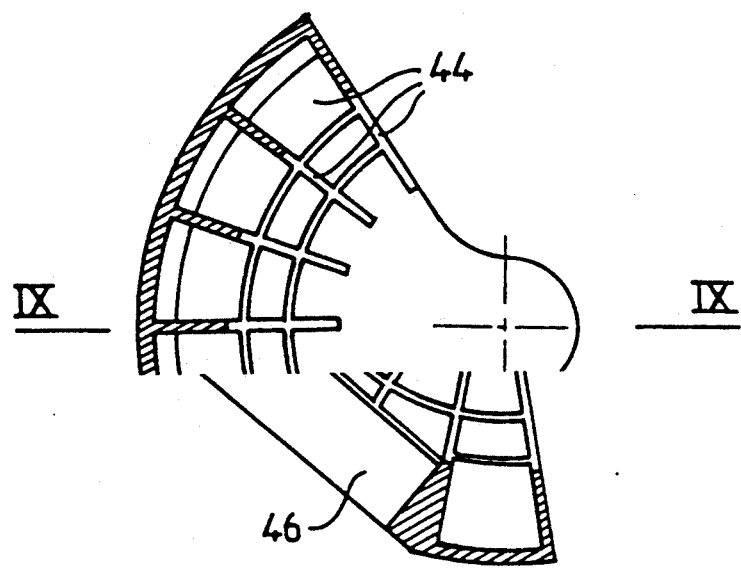
FIG. 10 is a plan view in section on line X—X of FIG. 9 through the valve member.

The valve member of the present invention as shown in FIGS. 9 and 10 is designed to have increased mechanical strength in the event that the valve is required to operate in a circuit subjected to high pressure. Stiffeners 44 reinforce the valve member 45 which is provided with an opening 46. If these stiffeners 44 are in a crisscross configuration, they provide a mesh of cells reinforcing the valve member. It is also possible to provide a massive valve member of large thickness that has the same mechanical strength against high pressure.

FIG. 11 shows a parallel connection of two valves with redundancy on closing of the present invention.

This assembly makes it possible with only two distinct valves, i.e. only two valve bodies, to obtain operation that is redundant both on opening and on closing and that is equivalent to operation with four conventional valves connected in two parallel branches each of which has two valves connected in series. In conventional dispositions providing redundancy both on opening and on closing, it is necessary to associate four valves each having its own value body and its own actuator device, thereby giving rise to an assembly which is complex, whereas the present invention reduces the mass and the bulk of the assembly and facilitates obtaining a compact installation of the valve member actuator devices.

What is claimed is:

1. A valve with redundancy on closing comprises a single valve body, first and second substantially hemispherical hollow valve members disposed inside said valve body, each including an orifice allowing fluid to pass therethrough, independent first and second rotary drive means for the first and second hemispherical valve members, and first and second sealing devices each comprising at least one annular gasket and each associated with a respective one of the first and second valve members, the first and second valve members being of different diameters and one being nestable inside the other.

2. A valve according to claim 1, including means for lifting off the first and second sealing devices while the first and second valve members are rotating.

3. A valve according to claim 1, wherein one of the sealing devices is not retractable, and comprises a sealing gasket constituted by a lip gasket, while the other one of the first and second sealing devices is retractable, means being provided to retract the retractable sealing device for the purpose of preventing fluid becoming confined inside the valve.

4. A valve according to claim 3, wherein the retractable sealing device is situated in the vicinity of the upstream, first valve member and is controlled as a function of the position of the downstream, second valve member such that said retractable sealing device is in its closed position when the second valve member is open, and vice versa.

5. A valve according to claim 4, including a cam secured to the second valve member to control retraction of the retractable sealing device situated in the vicinity of the first valve member.

6. A valve according to claim 4, wherein the sealing devices are caused to retract by a command from specific actuators that do not receive energy from either of the valve members.

7. A valve according to claim 6, including at least one pressure sensor situated in a length of inlet or outlet duct in the proximity of one of the first and second valve members to control retraction of the sealing devices.

8. A valve according to claim 6, including valve member position sensors controlling the retraction of the sealing devices.

9. A valve according to claim 3, wherein the retractable sealing device is situated in the vicinity of the downstream, second value member and is controlled as a function of the position of the upstream, first valve member such that said retractable sealing device is in its closed position when the first valve member is open, and vice versa.

10. A valve according to claim 9, including a cam secured to the first valve member to control retraction of the retractable sealing device situated in the vicinity of the second valve member.

11. A valve according to any claim 1, wherein the first and second sealing devices are retractable and are interconnected by at least one spacer disposed inside the first and second valve members such that when one of the first and second sealing devices is open, the other sealing device is closed.

12. A valve according to claim 11, wherein the means for retracting the retractable sealing device co-operating with the upstream, first valve member are controlled by the position of said first valve member co-operating with said sealing device.

13. A valve according to claim 12, wherein the means for retracting the retractable sealing device co-operating with the first valve member comprise a cam whose position is defined by the position of said first valve member co-operating with said sealing device, the profile of the cam being such that closing the first valve member causes said sealing device to close, while opening the first valve member causes said sealing device to open.

14. A valve according to claim 11, wherein the means for retracting the retractable sealing device co-operating with the downstream, second valve member are controlled by the position of said second valve member co-operating with said sealing device.

15. A valve according to claim 14, wherein the means for retracting the retractable sealing device co-operating with the second valve member comprise a cam whose position is defined by the position of said second valve member co-operating with said sealing device, the profile of the cam being such that closing the second valve member causes said sealing device to close, while opening the second valve member causes said sealing device to open.

16. A valve according to claim 1, wherein the axes of rotation of the first and second valve members are distinct although close together.

17. A valve according to claim 1, wherein the first and second valve members have axes of rotation that coincide.

18. A valve according to claim 1, including inlet and outlet lengths of fluid duct that are in alignment.

19. A valve according to claim 1, including inlet and outlet lengths of fluid duct extending in different directions.

20. A valve according to claim 1, wherein the first and second means for driving the first and second valve members in rotation are situated on diametrically opposite sides of the valve body.

21. A valve according to claim 1, wherein the first and second means for driving the first and second valve members in rotation are situated on the same side of the valve body.

22. A valve according to claim 1, including a monitor device triggering closure of one of the first and second valve members with a predetermined time delay relative to the command to close the other valve member and in the event that non-closure of said other valve member is detected at the end of said predetermined time delay.

23. A valve according to claim 1, wherein the first and second valve members are members of approximately constant thickness having smooth walls.

24. A valve according to claim 1, wherein the first and second valve members include stiffeners.

25. A valve according to claim 24, wherein the first and second valve members possess stiffeners in a criss-cross mesh constituting cells.

26. A redundant assembly for controlling the flow of fluid through a main duct, wherein the assembly comprises a circuit for insertion in said main duct, which circuit comprises two branches in parallel each of which is fitted with a valve having redundancy on closing according to claim 1.

* * * * *

UNITED STATES PATENT AND TRADEMARK OFFICE
CERTIFICATE OF CORRECTION

PATENT NO. : 5,247,964
DATED : September 28, 1993
INVENTOR(S) : Laurent DeLange

It is certified that error appears in the above-indentified patent and that said Letters Patent is hereby corrected as shown below:

Column 9, line 10, "thsi" should read --this--.

Column 10, line 69, "value" should read --valve--.

Signed and Sealed this

Ninth Day of August, 1994

Attest:

BRUCE LEHMAN

Attesting Officer    Commissioner of Patents and Trademarks